United States Patent [19]

Lougheed et al.

[11] 4,358,957

[45] Nov. 16, 1982

[54] TEMPERATURE MEASURING METHOD AND APPARATUS

[75] Inventors: Victor R. Lougheed, Hagerstown; John W. McGrew, Westminster, both of Md.

[73] Assignee: Teledyne Isotopes, Timonium, Md.

[21] Appl. No.: 184,365

[22] Filed: Sep. 5, 1980

[51] Int. Cl.³ .............................................. G01K 7/04
[52] U.S. Cl. ........................... 374/134; 374/136; 374/165; 374/179
[58] Field of Search .............. 73/154, 190 H, 341, 73/359 R, 361, DIG. 7

[56] References Cited

U.S. PATENT DOCUMENTS

| 2,352,247 | 6/1944 | Blau et al. ............................ 73/154 |
| 2,986,890 | 1/1960 | Bevans . | |
| 3,099,923 | 1/1960 | Benzinger . | |
| 3,332,285 | 10/1964 | Cook . | |
| 3,336,804 | 8/1967 | Poppendiek et al. ................. 73/204 |
| 3,354,720 | 8/1967 | Hager, Jr. | |
| 3,617,886 | 11/1971 | Werme . | |
| 3,715,923 | 2/1973 | Hornbaker et al. | |
| 3,834,237 | 9/1974 | Robertson . | |

*Primary Examiner*—Charles A. Ruehl
*Attorney, Agent, or Firm*—Fleit & Jacobson

[57] ABSTRACT

A thermoelectric temperature sensing apparatus in which the thermoelectric reference junction is not maintained at a constant temperature but instead heat is supplied to it or extracted from it at a predetermined, preferably constant, rate by a heater or cooler. The open circuit output voltage of the apparatus is referenced to this predetermined rate of heat supply or extraction to determine the temperature of the other thermoelectric junction. Where the heater or cooler is input responsive, the output voltage of the thermoelectric circuit is referenced to the heater or cooler input.

21 Claims, 5 Drawing Figures

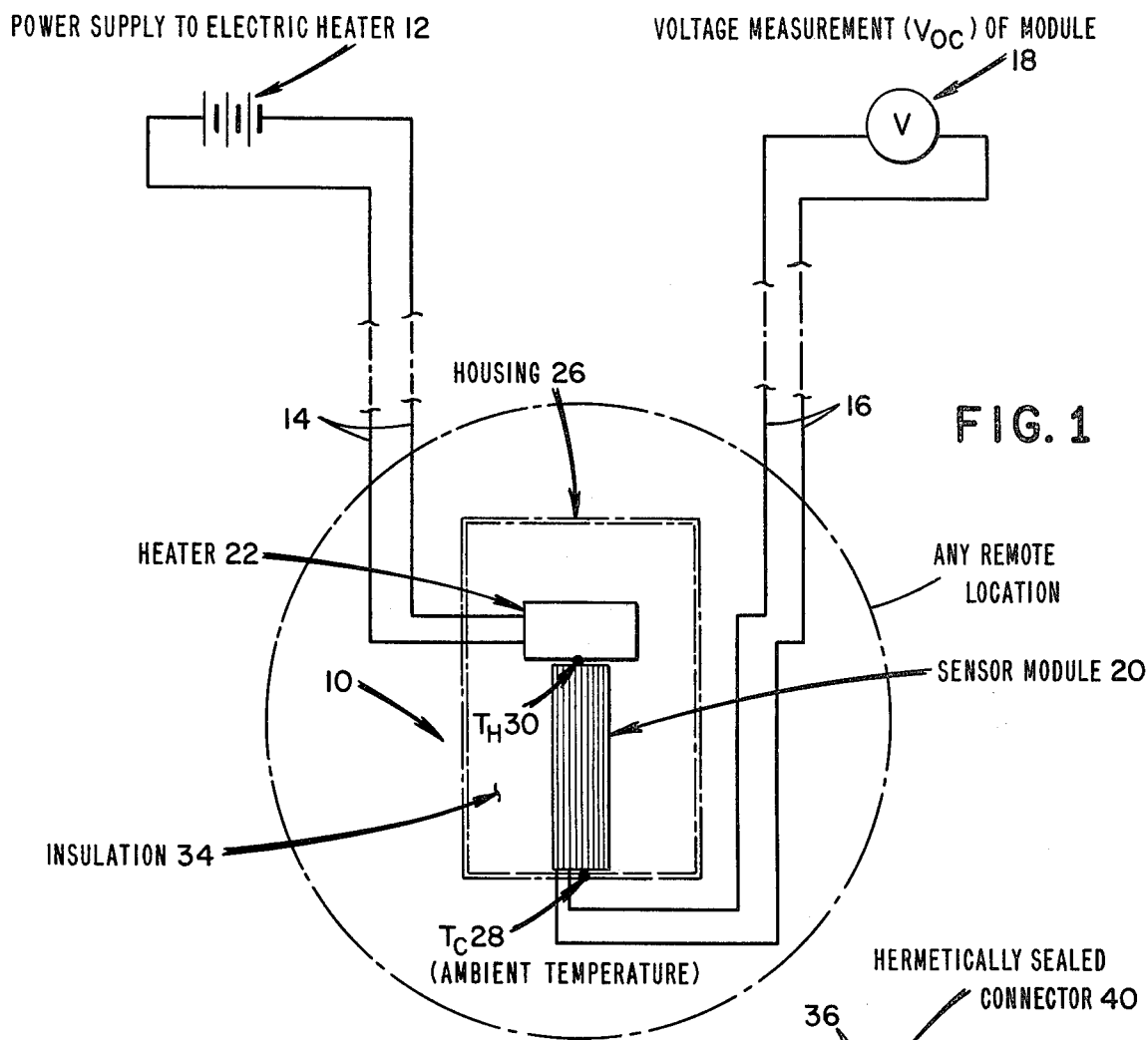
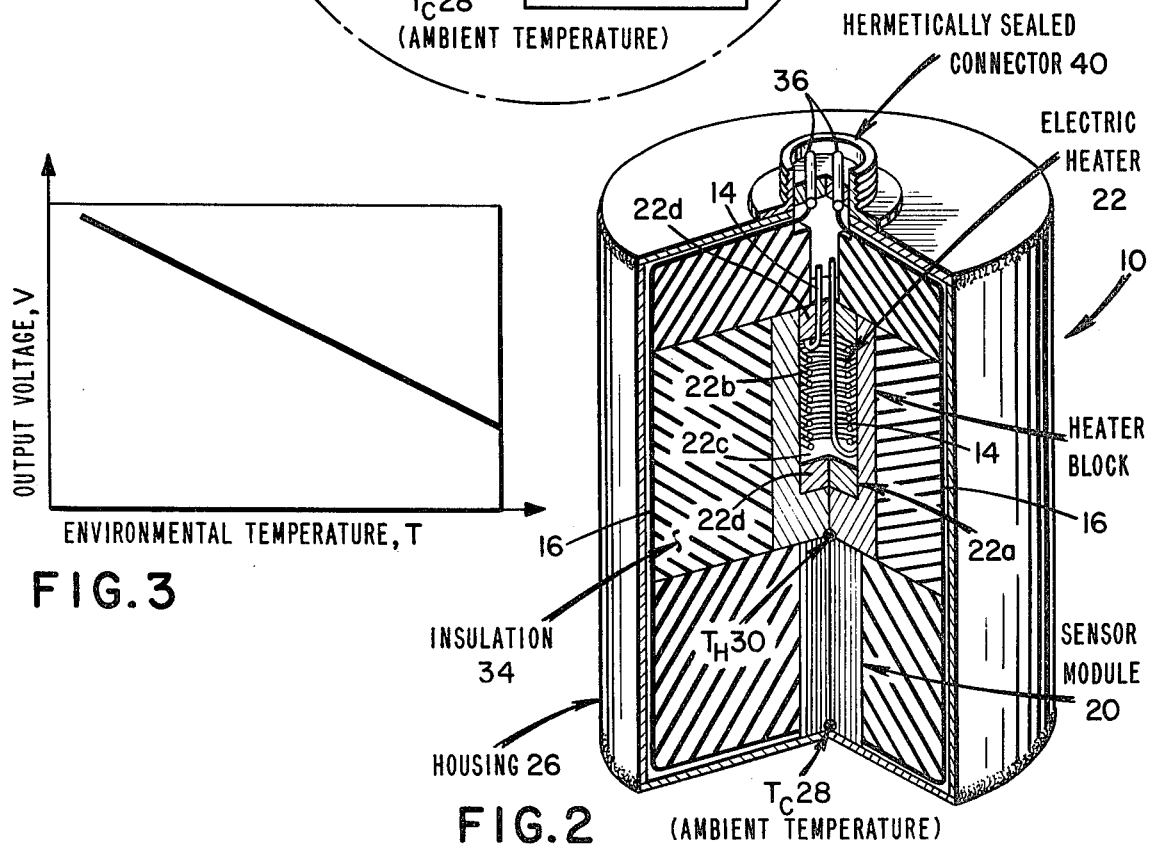

FIG.4

POWER SUPPLY TO HEAT PUMP (COOLING MODULES) 12

VOLTAGE MEASUREMENT ($V_{OC}$) OF SENSOR MODULE 18

HOUSING 26

HEAT PUMP 32 (COOLING MODULES) 3 UNITS CASCADED

ANY REMOTE LOCATION

INSULATION $T_C$ 30

SENSOR MODULE 20

$T_H$ 28 (AMBIENT TEMPERATURE)

FIG.5

HERMETICALLY SEALED CONNECTOR 40

HOUSING 26

SPRING LOADED WEDGE 46

HEAT PUMP (COOLING MODULES) (COOLER 32)

$T_C$ 30

SENSOR MODULE 20

INSULATION 34

$T_H$ 28 (AMBIENT TEMPERATURE)

TEMPERATURE MEASURING METHOD AND APPARATUS

BACKGROUND OF THE INVENTION

This invention relates to a method and apparatus for measuring temperature, using thermoelectric sensing means, and finds particular application to the measurement of temperatures in inaccessible locations such as, for example, in earth boreholes.

The principle of utilizing a thermoelectric sensing means to detect and measure temperature is well known and is based on the Seebeck effect, namely that in a circuit comprising a pair of junctions formed between dissimilar metals, a voltage will be generated between the junctions when these junctions are at different temperatures, such voltage being a function of the temperature difference and hence for a fixed geometry the heat flow between the junctions. To make practical use of this principle in obtaining accurate temperature measurements, it has been common practice to establish one of the junctions of the circuit as a reference junction, which, by any suitable means, is retained at a known constant temperature, and to expose the other junction to a temperature to be measured, so that the voltage output of the circuit represents the difference in temperature between a known constant temperature and the temperature to be measured, whereby the device can be readily calibrated in relation to the known reference temperature.

Commonly, in temperature measuring systems of the above type, the reference junction is the "cold" junction of the circuit which is maintained at a lower temperature than the temperature to be measured to which the other junction (the "hot" junction) of the circuit is exposed. A cooling medium, with thermostatic or like control, is normally employed to maintain the reference junction at a constant known temperature and heat flows through the system from the hot junction to the cold junction.

Known systems as described above, have certain disadvantages for use in measuring temperatures in applications such as earth boreholes, where for example the device may be required to operate in a hostile environment without maintenance over an extended time period and where read-out of the measured temperature is required at a location remote from the point of measurement. For example, the output signal voltage from conventional thermocouple systems, even multi-junction systems, is relatively low and in practice requires amplification to provide usable information. The system is thus generally complicated by the inclusion of amplification equipment and the problem of low output voltage is accentuated in applications where read-out is to take place at the location remote from the point of temperature measurement, because of line losses. Further, the requirement for maintaining the reference junction at a constant temperature necessiates inclusion in the system of further ancillary apparatus and control means. In the case of an earth borehole for example, this would mean that such ancillary apparatus would have to be included in the equipment which is actually lowered down the borehole and not only are size considerations a factor in this respect, but also the down hole temperatures (possibly approaching 500° C. or more) and general physical conditions may be of an order which precludes practical operation of such ancillary apparatus over extended time periods.

It is an object of the present invention to provide a temperature measuring method and apparatus utilizing a thermoelectric sensing means, which does not rely on maintaining a constant reference junction temperature.

Another object of the invention is to provide a temperature measuring method and apparatus which is particularly suited for use in applications where the point of temperature read-out is required to be situated at a remote location from the point of temperature measurement.

Another object of the invention is to provide a temperature measuring system having a high degree of reliability in performing temperature measurement in a thermally hostile environment over an extended time period.

A further object of the invention is to provide a temperature measuring method and apparatus using thermoelectric sensing means which dispenses with the need for output signal amplification.

Still another object of the invention is to provide a temperature sensing device particularly suitable for use in earth boreholes and like applications.

SUMMARY OF THE INVENTION

The invention is based on the principle that the open circuit voltage output of a thermoelectric couple circuit is a function of the temperature difference between the circuit junctions. If a known quantity of heat is either applied to or extracted from one of the circuit junctions, the resulting open circuit output voltage will vary with the temperature of the other junction because of the combined effects of thermoelement property changes that occur with temperature changes. According to the invention therefore heat is either applied to or extracted from one of the junctions of the thermoelectric sensing circuit at a predetermined rate, by way of a heater or cooler, and the temperature of the other junction (which is exposed to a temperature being measured) is determined by relating the resulting open circuit output voltage to the known rate of heat supply or extraction. In contrast to known arrangements, the voltage output of the present system is thus referenced to a predetermined rate of heat supply or extraction rather than to a constant reference temperature, to determine the temperature being measured.

In carrying out the invention, it is necessary that some degree of heat will be transported through the thermoelectric sensing circuit, during the actual sensing operation in order to establish the open circuit voltage, as will be clearly illustrated hereinafter. However, the amount of heat that must be transported through the sensing circuit (the sensing module of the invention) is quite small, on the order of five watts. Therefore, the dissipation of this heat plus the heater or cooler power by the system housing for the present invention will not appreciably change the temperature of the housing (or the junction adjacent the housing) from that of the surroundings (i.e., from the temperature to be measured).

Taking the inventive concept a stage further, the amount of heat supplied by the heater or heat extracted by the cooler is, in the case of an input responsive device, itself a function of the energy input to the heater or cooler. Accordingly, the output voltage of the thermoelectric circuit can be referenced to this energy input to determine the temperature being measured.

Thus, in practical embodiments of the invention, a heater or cooler is situated in intimate heat-conducting relationship with one set of junctions of a thermopile sensing module, having its other set of junctions adapted to be exposed, through suitable heat conducting means, to a temperature to be measured and the entire assembly being housed in a suitably heat insulated container. The heater or cooler is adapted to provide a predetermined rate of heat supply or heat extraction, conveniently by arranging for the heater or cooler to be supplied with a constant energy input and the system is provided with means for measuring the open circuit output voltage of the thermopile module and with calibration means relating the output voltage to temperature and based on the relationship between the output voltage and the constant energy input. It will thus be seen that the system does not rely on maintaining a constant temperature reference junction since the output circuit voltage is referenced to a quantity of heat flow or input energy rather than to temperature.

The concept of the invention may be more readily understood by appreciating that in conventional thermoelectric sensing systems, the reference junction is maintained at a constant temperature, by suitable thermostatically or otherwise controlled heating or cooling means and in order to maintain this temperature constant, as ambient temperature conditions vary, a greater or lesser amount of heat is supplied or extracted by the heating or cooling means. By contrast, in accordance with the present invention, at least in its preferred and practical form, no effort is made to maintain a constant reference junction temperature, but rather the amount of heat supplied to or extracted from the reference junction is kept substantially constant and the temperature of the other junction is obtained from the open circuit output voltage of the sensing means by calibrating this voltage to temperature with reference to the known amount of heat supply or extraction.

As indicated, the means for supplying heat to or extracting heat from the reference junction of the thermoelectric sensing means at a known rate can be any suitable form of heater or cooler located in intimate heat conducting relationship with this junction. Where a heater is used, this may conveniently be an electric heater, which has a predetermined heat flow output dependent on its power input. Similarly, if a cooler is used to extract heat from the reference junction at a predetermined rate, this may take the form of an input responsive device such as a thermoelectric heat pump of one or more stages having a rate of heat extraction dependent on its power input. It is also within the scope of the invention however to use a non-input-responsive means for supplying heat to the reference junction. For example, a radioisotope heat source is suitable since this emits a predictable heat output which varies only slightly with time in a known manner. It is accordingly possible accurately to gauge the heat output of the isotope at any time during its life span and to calibrate the voltage output of the thermoelectric sensing means against temperature in relation to the known isotope output.

Heating and cooling devices which are responsive to electrical input can be calibrated by measuring heat output as a function of input current so that by maintaining a known input current, the required heat conversion is maintained despite any Joule heating effect in the input leads. If heater or cooler performance is a significant function of temperature, calibration of the sensor will provide automatic compensation.

As applied to the measurement of temperature in an earth borehole for example, a typical system comprises a compact measurement module, which in use is physically situated within the borehole, this module containing the thermoelectric sensing means and the heater or cooler in a suitably insulated container, and having a connection for output leads from the thermoelectric means to measure open circuit output voltage and, if an input responsive heater or cooler is used, a connection for its power input. Preferably, the thermoelectric sensing means comprises a silicon-germanium multi-junction thermopile, since these metals when used to form the thermoelectric circuit provide a relatively high voltage output per unit flow of heat between the junctions and can tolerate high junction temperatures. This arrangement thus provides a relatively high open circuit output voltage, which can be accurately measured, through suitable output signal leads, at a remote location with essentially no Joule heating loses, since substantially no output current flow is involved. The system further lends itself to borehole use where an isotope heater is used in the measurement module, since in this case no downhole power input leads are required.

DESCRIPTION OF DRAWINGS

FIG. 1 is an electrical circuit diagram illustrating the principles of a first form of temperature measuring system in accordance with the invention;

FIG. 2 is a perspective view, in partial section, of a temperature sensing module suitable for use in the system of FIG. 1;

FIG. 3 is a conversion curve of the type used in conjunction with the system shown in FIG. 1 for obtaining temperature readings from readings of the open circuit output voltage of the system;

FIG. 4 is an electrical circuit diagram illustrating the principles of the second form of temperature measuring system in accordance with the invention; and FIG. 5 is a perspective view, in partial section, of a temperature sensing module suitable for use in the system of FIG. 4.

DESCRIPTION OF PREFERRED EMBODIMENTS

The temperature measuring system diagrammatically illustrated in FIG. 1 is particularly, though not exclusively, suitable for use in an application such as the measurement of temperature in an earth borehole or the like, where read-out of the sensed temperature is to be effected at a location remote from the point of temperature measurement. Basically, the system hardware consists of a temperature sensor 10, which in use is physically located at the point of temperature measurement, an electric power source 12 and input leads 14 for supplying input energy at a constant predetermined rate to sensor 10, and output leads 16 and a high impedance voltmeter 18 or the like for measuring the open circuit output voltage from the sensor.

Sensor 10 comprises a sealed housing 26 containing a multi-junction thermoelectric sensing module 20 and an electric heater 22, which provides a predetermined output dependent on its energy input. The thermoelectric sensing module has one set of junctions 28 in intimate heat conducting contact with a heat conducting surface portion of housing 26 and its other set of junctions 30 in intimate heat conducting contact with heater 22. Apart from the one set of junctions of the thermoelectric module which are in heat conducting contact with housing 26, both the module 20 and the heater 22 are heat isolated from the housing by suitable insulation, 34. The input leads 14 to heater 22 and the output leads 16 from the thermoelectric module enter housing 26 through a suitable hermetically sealed connector.

With this arrangement, the temperature of junctions 28, the cold junction (TC), of the thermoelectric module is essentially equal to the ambient temperature of the environment (approximately the housing temperature) in which the sensor 10 is located because of the low required sensor heat throughput and good thermal contact with the housing, while the hot junction temperature (TH) of junctions 30 is dependent on the heat output from heater 22 which is itself dependent on the energy input to the heater. Accordingly, the heat flow through the thermoelectric module and hence its open circuit output voltage is dependent solely on the rate of input to the heater and temperature TC and the thermoelectric properties of the sensor module material. Therefore, for a known and preferably constant power input to heater 22, temperature TC is obtained by relating the open circuit output voltage to the power input through a suitable conversion curve of the type shown in FIG. 3, which converts voltage output readings to readings of temperature TC with reference to the known power input based on the properties of the thermoelectric materials.

A practical form of temperature sensor 10 for use in the system as described in FIG. 1, is shown in FIG. 2, this sensor being particularly suitable for measuring earth bore hole temperatures up to about 500° C.

In this example, the housing 26 is a metal cylinder, the precise material being dependent on the nature of the environment to which the sensor is to be exposed. Typically, the housing may be a 300 Series stainless steel, or if more severe sulphur-containing environments are anticipated Hastelloy N or MP 35 may be used.

The thermoelectric module 20 has junctions 28 in intimate heat conducting contact with the base of housing 26 as shown. The design of this module will be dependent on the individual application and a more detailed example of the manner in which the module may be designed is given below. The preferred embodiment utilizes silicon-germanium alloys, as stated previously. With these materials, temperatures ranging from 100° to 500° C. and higher can be measured. However, bismuth telluride materials are also suitable for sensing temperatures in the 100° to 300° C. range. The number of thermoelectric couples required per sensing module is determined by the required voltage output and the properties of the materials, such as Seebeck coefficient and thermal conductivity. Generally, the module will have one to two hundred or possibly more thermocouples.

Electric heater 22 may comprise a metal sheath 22a of stainless steel, nickel or the like, with Nichrome wire 22b wound around a ceramic core 22c and ceramic insulating fill 22d.

Housing 26 is filled with thermal insulating material 34 such as Johns Manville Min-K 1800 fibrous insulation and the sensing module output leads 16 are connected to terminals 36 associated with a hermetically sealed connector 40 on the upper wall of housing 26, and which also contains sealed passages for the heater input leads 14.

Good thermal contact between the internal components of sensor 10 is maintained with direct spring loading.

In designing a sensor 10 for operation in an environment of a particular temperature range, use is made of the relationship between heater input and open circuit output voltage of the thermoelectric circuit, so that for a required temperature range and a required heater input, the various remaining parameters of the sensor can be established. Such calculations make use of the following relationships:

$Q_{TE} = Q_H - Q_P =$ heat transported through the thermoelectric material where, $Q_H =$ heater output, and
$Q_P =$ parasitic heat loss $Q_H = I^2 R =$ heat generated in electrical heater where, I = current supplied to heater, and
R = resistance of heater $$Q_P = kA \frac{T_H - T_A}{\Delta X} = \text{parasitic heat loss}$$

where, k = thermal conductivity of insulation,
A = average cross sectional area of the heat flow path through the insulation from the heater to the housing
$\Delta X$ = the average length of the heat flow path through the insulation leading from the heater to the housing
$T_H$ = approximate heater temperature, and
$T_A$ = housing temperature.

$$E_{OC} = \int_{T_{CJ}}^{T_{HJ}} \alpha \, dt = \text{sensor module open circuit voltage}$$

where, t = local temperature of thermoelement material
$T_{HJ}$ = hot junction temperature of sensor module approximately equal to $T_H$
$T_{CJ}$ = cold junction temperature of sensor module approximately equal to $T_A$, and
$\alpha$ = Seebeck coefficient (a function of temperature t) of sensor module material $$Q_{TE} = \frac{A_{TE}}{X_{TE}} \int_{T_{CJ}}^{T_{HJ}} k \, dt = \text{heat flow through sensor module}$$

where, $A_{TE}$ = total cross sectional area of the sensor module thermoelectric elements.
$X_{TE}$ = length of sensor module thermoelectric elements, and
k = thermal conductivity (a function of temperature t) of sensor module material Since the thermoelectric material is well characterized and $\alpha$ and k are known functions of t, by having values of $Q_{TE}$ and $E_{OC}$, two equations in two unknowns are obtained. Solution for unique values of $T_{HJ}$ and $T_{CJ}$ thus $T_H$ and $T_A$ is possible if $\alpha$ and k are monotonic functions of t, and either dk/dt or dα/dt is not constant. (If both dk/dt and dα/dt are constant, they must not be equal for a solution to exist.)

The following example illustrates the manner in which a sensing module is designed specifically for use in sensing temperature in an earth borehole.

ASSUMED DESIGN CRITERIA

Output voltage = 5 volts
Range of temperatures to be measured = 100° C. to 300° C. (212° F. to 572° F.)
Housing outside diameter = 4"

THERMOELECTRIC MODULE CHARACTERISTICS $E_{OC}$ maximum = 5 volts
Maximum measured temperature = 300° C. (572° F.)
Maximum hot side temperature = 350° C. (662° F.)

$\overline{aN}$ from 300° to 350° C. = 270 μv/°C.
$\overline{aP}$ from 300° to 350° C. = 187 μv/°C.
$E_{OC}$/couple = 457 μv/°C. × 50° C. = 0.02285 volts
Number of couples = (5)/(0.02285) = 218
Number of elements = 436
A 21×21 array = 441 elements for square module
A 20×22 array = 440 elements for a rectangular module
$\overline{aN}$ = average Seebeck coefficient of N-type thermoelectric material.
$\overline{aP}$ = average Seebeck coefficient of P-type thermoelectric material.

Since power output is not a factor, the element cross sectional area is decided by the minimum dimensions that can be conveniently fabricated. Also, the length is the maximum that can be conveniently fabricated to allow use of a small heater (or cooler) to achieve the assumed hot to cold temperature difference.

Assume elements are 0.025 inch square by 0.5 inch long.

$$\text{Heat flow} = kA \frac{\Delta T}{\Delta X} = Q$$

$$Q = (k_N + k_P) A_{element} \frac{(T_{hot} - T_{cold})}{\text{length}} \times 218 \text{ couples}$$

$$= 3.29 \text{ watts for the sensor module}$$

(Since open circuit voltage is measured, there is no joule heating.)

Sensor Resolution

R = voltage output/couple/degree C. × the number of couples
where R = resolution in volts per degree C. voltage/couple/degree C. = 457μ V/degree C. number of couples = 218
R = 457μ V/couple/degree C. × 218 couples = 0.01 volt/degree C.

HOUSING AND HEATER DESIGN

Assume 10,000 ft depth, 4" O.D.

$$\text{Hydrostatic pressure} = \frac{62.4 \text{ lb/cu ft} \times 1000 \text{ ft}}{144 \text{ sq in/sq ft}} = 4330 \text{ psi}$$

-continued

Assumption {
Use ⅜" nominal wall thickness for cylinder (304 s/s or similar material)
Use ¼" thick end plates
Min-K insulation (or similar) has a k of 0.03 Btu/hr-ft-°F. or less
}

Parasitic Heat Losses $$Q = KA \frac{\Delta T}{\Delta X} = \text{parasitic heat loss}$$

k = insulation thermal conductivity
A = mean heat loss path cross section area
ΔT = temperature difference between heater and housing
ΔX = mean heat loss path length
Q = 1.23 watts Heater capacity must be 1.23 + 3.29 or 4.52 watts FIG. 3 shows a conversion curve of the type used for the module illustrated in FIG. 2 for determining the temperature of junctions 28 of the sensing module from the generated open circuit output voltage and based on the rated heater input.

The curve is established by applying the required heater input to the heater and measuring the open circuit ouput voltage of the thermoelectric circuit while the sensor is stabilized in an environment at:

1. The minimum sensor anticipated environmental temperature.
2. The maximum sensor anticipated environmental temperature.
3. One or more additional temperatures equally spaced between the minimum and maximum temperatures. The resulting data are then graphed as shown in FIG. 3.

In FIG. 4 there is illustrated a further temperature measuring system in accordance with the invention, which is similar in principle to the system illustrated in FIG. 1 and like references are used to denote like parts. The power source 12, and voltmeter 18 are shown in FIG. 4, and it will be understood that these elements conform with those as shown in the FIG. 1 arrangement. In this case, the heater 22 of FIG. 1 is replaced by a cooler 32 in the form of a thermoelectric heat pump of one or more stages, which extracts heat at a predetermined rate from one set of junctions 30 of the thermoelectric sensing module, the rate of heat extraction again being dependent on the energy input to the heat pump. The other set of junctions 28 of the sensing module 20 is again in intimate contact with a heat conducting portion of housing 26, thereby reflecting ambient temperature, so that heat flow through module 20 is in this case dependent on the temperature TH of junctions 28 and the rate of heat extraction imposed on module 20 by the cooler 32, and hence on the energy input to cooler 32. In this case, the heat flow through module 20 is in the reverse direction to the previously described embodiment, but again, the temperature of the junctions 28 is obtained from a conversion curve relating the open circuit output voltage of module 20 to temperature with reference to the rated input to cooler 32. Note that in FIG. 5, a reversal of the hot junction, TH, and the cold junction, TC, from FIG. 2 has occurred, but the numerical notations have remained the same.

Design of a sensor for use in the system illustrated in FIG. 4 is based on similar considerations to those applying in the design of a sensor as described in relation to FIGS. 1 and 2. In this case, the sensor parameters are calculated from functions relating the known temperature range of operation to the required cooler input.

A sensor in practical form, for use in the system of FIG. 4 is shown in FIG. 5. It will be seen that this is basically of similar form to the sensor shown in FIG. 2 and like references are again used to denote like parts. In this case, the heater 22 is replaced by a cooler in the form of a thermoelectric heat pump 32. To maintain good thermal contact between the internal components of sensor 10, direct spring loading can be used at the ends of the housing or a spring loaded thermal wedge 46 can be interposed between the sensing module 20 and the cooler 32. To simplify the drawing, the cooler input leads have been omitted, but it will be understood that these issue from connector 40 in like manner to the heater input leads in the previous embodiment. The heat pump is typically formed from bismuth telluride and the sensor shown in FIG. 4 is generally suitable for sensing temperatures up to about 250° C. Silicon-germanium may be more practical for higher temperature applications.

For a system utilizing a thermoelectric cooler as shown in FIGS. 4 and 5, the various parameters can be obtained in a similar manner to those of the previous embodiment except that in this case:

$$Q_{TE} = Q_C + Q_P$$

where, $Q_C$ (heat transported through the thermoelectric cooler) =

$$\alpha_{CJ} T_{CJ} I_C + \frac{I_C}{2} \int_{T_{CJ}}^{T_{HJ}} t \frac{d\alpha}{dt} dt - \frac{I_C^2}{2(T_{HJ} - T_{CJ})} \int_{T_{CJ}}^{T_{HJ}} R \, dt - \int_{T_{CJ}}^{T_{HJ}} K \, dt$$

$\alpha_{CJ}$ = Seebeck coefficient at $T_{CJ}$
$I_C$ = current supplied to cooler
R = resistance of thermoelectric cooler module material, a function of temperature t
K = thermal conductivity of cooler module material, a function of temperature t The sensor is provided with a calibration curve of similar nature to the curve shown in FIG. 3 and which is derived in a similar manner by applying the required input to the cooler 32 and plotting the environmental temperature points in the same manner as described in relation to FIG. 3.

The following example illustrates how a sensing module is designed using a heat pump as a cooler, for a similar application as the previously described example.

THERMOELECTRIC MODULE CHARACTERISTICS

In the cooler-based system the hot end of the thermoelectric module is in intimate contact with the sonde housing (not the cold end as in the heater-based configuration) and the cold end contacts the cooler (heat pump) module, therefore the thermoelectric module will require redesign to achieve the original criteria of 5 volt output at a measured temperature of 300° C. The redesigned sensor module has the following characteristics:

$E_{OC}$ maximum = 5 volts
Maximum measured temperature ($T_{HJ}$) = 300° C.
Cold junction temperature ($T_{CJ}$) = 250° C.
Number of couples = 248
Number of elements = 496
Element size = 0.025 inch square by 0.5 inch long
Heat transport through module = 4.058 watts

HOUSING AND COOLER DESIGN

The housing design and insulation are very similar to the design for an electrical heater. The heat gain through the insulation is approximately 1.23 watts. Thus, the design requirements of the thermoelectric cooling module are:

Refrigerating capacity = 5.29 watts
Hot side temperature = 300° C.
Cold side temperature = 250° C.

Design goals for ease in integration of the cooler system are:

Total thermoelement cross sectional area = 0.31 square inch (0.55 inch × 0.55 inch)
Optimum current in circuit = 1.0 amp
Optimum current for a thermoelectric cooler is given by $$I_{opt} = \frac{\bar{\alpha} T_C}{\bar{\rho}} \frac{A}{L}$$

where,
$\bar{\alpha}$ = average couple Seebeck voltage
$T_C$ = absolute cold junction temperature
$\bar{\rho}$ = average couple resistance
A = element area
L = element length For silicon germanium material, considering the specific design requirements and goals:

$$1 \text{ amp} = \frac{403 \times 10^{-6} \frac{\text{volts}}{°K.} \times 551° K.}{1.27 \times 10^{-3} \text{ ohm inch}} \times \frac{A \text{ (inch)}^2}{L \text{ (inch)}}$$

$$\frac{A}{L} = \frac{1.27 \times 10^{-3} \text{ inch}}{403 \times 10^{-6} \times 551} = 0.005715 \text{ inch}$$

The maximum refigeration capacity per couple at optimum current is:

$$QC_{max} = \frac{\alpha^{-2} T_C^2}{2 \bar{\rho} \frac{L}{A}} - \bar{k} \Delta T$$

where,
$\bar{k}$ = average couple thermal conductivity
$\Delta T$ = hot to cold junction temperature difference Thus, $QC_{max}$ per couple =

$$\frac{(403 \times 10^{-6})^2 \frac{\text{volts}^2}{°K.^2} \times (551° K.)^2}{2 \times 1.27 \times 10^{-3} \text{ ohm inch} \times .005715 \text{ inch}} -$$

$$3.141 \frac{\text{watts}}{\text{ft °C.}} \times \frac{.005715}{12} \text{ ft} \times 50° C.$$

$$= 0.0363 \text{ watts}$$

-continued $$\text{Number of couples, } n = \frac{\text{Total } QC}{QC \text{ per couple}} = \frac{5.29}{0.0363} = 145.72$$

Considering 146 couples with a total area of 0.31 square inch, the dimensions of each element must be 0.033 inch square × 0.1857 inch long. The voltage required to drive the cooler is $V_{in}$, where, $V_{in} = n\left(\bar{\alpha}\Delta T + \bar{I}\rho\frac{L}{A}\right) =$ $$146\left(403 \times 10^{-6} \times 50 + 1.27 \times 10^{-3} \times \frac{1}{.005715}\right) =$$

35.39 volts

Power input = 35.39 watts

Coefficient of Performance, Refrigerator =

$$\frac{QC}{P} = \frac{5.29}{35.39} = 0.1495$$

As indicated, a radioisotope heat source may be used instead of an electrical heater in a system of the type illustrated in FIG. 1. In this case, a predetermined isotope thermal inventory will be specified and a curve similar to that shown in FIG. 3 can be generated for calibration purposes. The radioisotope used is selected on the basis of its half-life so that its decay with the attendant reduction in thermal output will not present a significant short term (4 or 5 years) temperature error.

It will be appreciated from the embodiments described, that the invention provides a method and apparatus for temperature measurement which is particularly suitable for use in earth borehole applications and the like but which can also be adapted for use in other applications. The sensors shown in FIGS. 2 and 5 are of a size and shape which are practical for use in borehole applications and provide protection against anticipated pressures, corrosion and thermal environments. The design of each sensor ensures that the heat transport through the sensor is known while the construction still enables the temperature of the one module junction which contacts the sensor housing to be as close as possible to the ambient temperature. The sensor provides a relatively high voltage output signal due to the high output per junction of the thermoelement materials in comparison to typical thermocouple junctions and to the multiplicity of junctions with series voltage generation. Further, since the open circuit voltage output is measured, substantially no current flow is involved and thus no Joule heating losses can effectively impair signal measurement accuracy.

While only preferred embodiments of the invention have been described in detail, it is to be understood that the invention is not limited to the particular features described and numerous modifications can be made within the scope of the attached claims.

What is claimed is:

1. A temperature measuring system comprising thermoelectric sensing means having opposed junctions, said sensing means being adapted to generate an open circuit output voltage dependent on the temperature difference, hence heat flow, between said junctions, means for supplying heat to or extracting heat from said sensing means at a predetermined rate through one of said junctions, means for measuring the open circuit output voltage of said sensing means and means for relating the measured open circuit output voltage of said sensing means to said predetermined rate of heat supply or heat extraction for determining the temperature of said other of said junctions.

2. The system as defined in claim 1 wherein said means for supplying heat to or extracting heat from said thermoelectric sensing means includes an input responsive heating or cooling means in heat conducting relationship with said one of said junctions and means for supplying said heating or cooling means with a predetermined energy input and wherein said means for relating the measured open circuit voltage of said sensing means to said predetermined rate of heat supply or heat extraction comprises means for relating the measured open circuit voltage to said predetermined energy input.

3. The system as defined in claim 2 wherein said means for supplying said heating or cooling means with a predetermined energy input comprises a constant energy input source.

4. The system of claim 3 wherein said means for relating the measured open circuit voltage to said predetermined energy input comprises conversion means relating said open circuit voltage to the temperature of the other said junctions with reference to said constant energy input.

5. The system of claim 4 wherein said conversion means comprises a curve of open circuit output voltage plotted against the temperature of the other of said junctions with reference to said constant energy input.

6. The system of claim 2 wherein said means for supplying heat to or extracting heat from said sensing means comprises electric heating means for supplying heat to said sensing means, said electric heating means being in intimate heat conducting contact with said one of said junctions.

7. The system of claim 2 wherein said means for supplying heat to or extracting heat from said sensing means comprises thermoelectric cooling means for extracting heat from said sensing means, said cooling means being in heat conducting contact with said one of said junctions.

8. The system of claim 1 wherein said means for supplying heat to said sensing means comprises a radioactive isotope heat source heating means, for supplying heat to said sensing means, said radioisotope heating means being in intimate heat conducting contact with said one of said junctions.

9. A method of measuring temperature comprising the following steps:

providing thermoelectric sensing means having opposed junctions, said sensing means being adapted to generate an open circuit output voltage dependent on heat flow through said sensing means between said junctions, exposing one of said junctions to a temperature to be measured while supplying heat to or extracting heat from said sensing means at a predetermined rate through the other of said junctions, measuring the open circuit output voltage of said sensing means and relating the measured voltage to said predetermined rate of heat supply or heat extraction to determine the temperature of said one of said junctions.

10. The method of claim 9 including supplying heat to or extracting heat from said sensing means through said other of said junctions by energy input responsive heating or cooling means in heat conducting contact with said other of said junctions, controlling the rate of energy input to said heating or cooling means and relating the measured open circuit output voltage of said sensing means to said rate of energy input to determine the temperature of said one of said junctions.

11. An apparatus for use in measuring temperature comprising an enclosed heat-conducting housing means, thermoelectric sensing means within said housing means, said sensing means having opposed junctions, one of said junctions being in heat conducting relationship with said housing means, the other of said junctions being effectively heat-insulated from said housing means, a heater means within said housing means adapted to supply heat at a predetermined rate to the other of said junctions, said heater means being in heat-conducting relationship with said other of said junctions and being effectively heat-insulated from said housing means, and output means leading through the housing means from the electrical circuitry of said thermoelectric sensing means for measuring the open circuit output voltage of said sensing means.

12. The apparatus as defined in claim 11 wherein said heater means comprises an input-responsive heater means and said apparatus further includes input means leading through said housing means for delivering input energy to said heater means.

13. The apparatus as defined in claim 12 wherein said heater means comprises an electric resistance heater means.

14. The apparatus as defined in claim 11 wherein said heater means comprises a radioactive isotope heat source heating means.

15. The apparatus as defined in claim 11 wherein said housing means comprises a metal container, with said one junction of said thermoelectric sensing means having a heat-conducting connection with the inner wall surface of said container and said container including heat insulating material effectively insulating said other junction of said sensing means and said heater means from said inner wall surface.

16. The apparatus as defined in claim 15 wherein said container is substantially cylindrical.

17. An apparatus for use in measuring temperature comprising an enclosed heat-conducting housing means, thermoelectric sensing means within said housing means, said sensing means having opposed junctions, one of said junctions being in heat-conducting relationship with said housing means, the other of said junctions being effectively heat-insulated from said housing means, a cooling means within said housing means adapted to extract heat at a predetermined rate from the other of said junctions, said cooling means being in heat-conducting relationship with said other of said junctions and being effectively heat-insulated from said housing means, and output means leading through the housing means from the electrical circuitry of said thermoelectric sensing means for measuring the open circuit output voltage of said sensing means.

18. The apparatus as defined in claim 17 wherein said cooling means comprises an input-responsive cooling means and said apparatus further includes input means leading through said housing means for delivering input energy to said cooling means.

19. The apparatus as defined in claim 18 wherein said cooling means comprises a thermoelectric heat pump means.

20. The apparatus as defined in claim 17 wherein said housing means comprises a metal container with said one junction of said thermoelectric sensing means having a heat-conducting connection with the inner wall surface of said container and said container including heat-insulating material effectively insulating said other junction of said sensing means and said cooling means from said inner wall surface.

21. The apparatus as defined in claim 20 wherein said container is substantially cylindrical.

* * * * *